Figure 1:
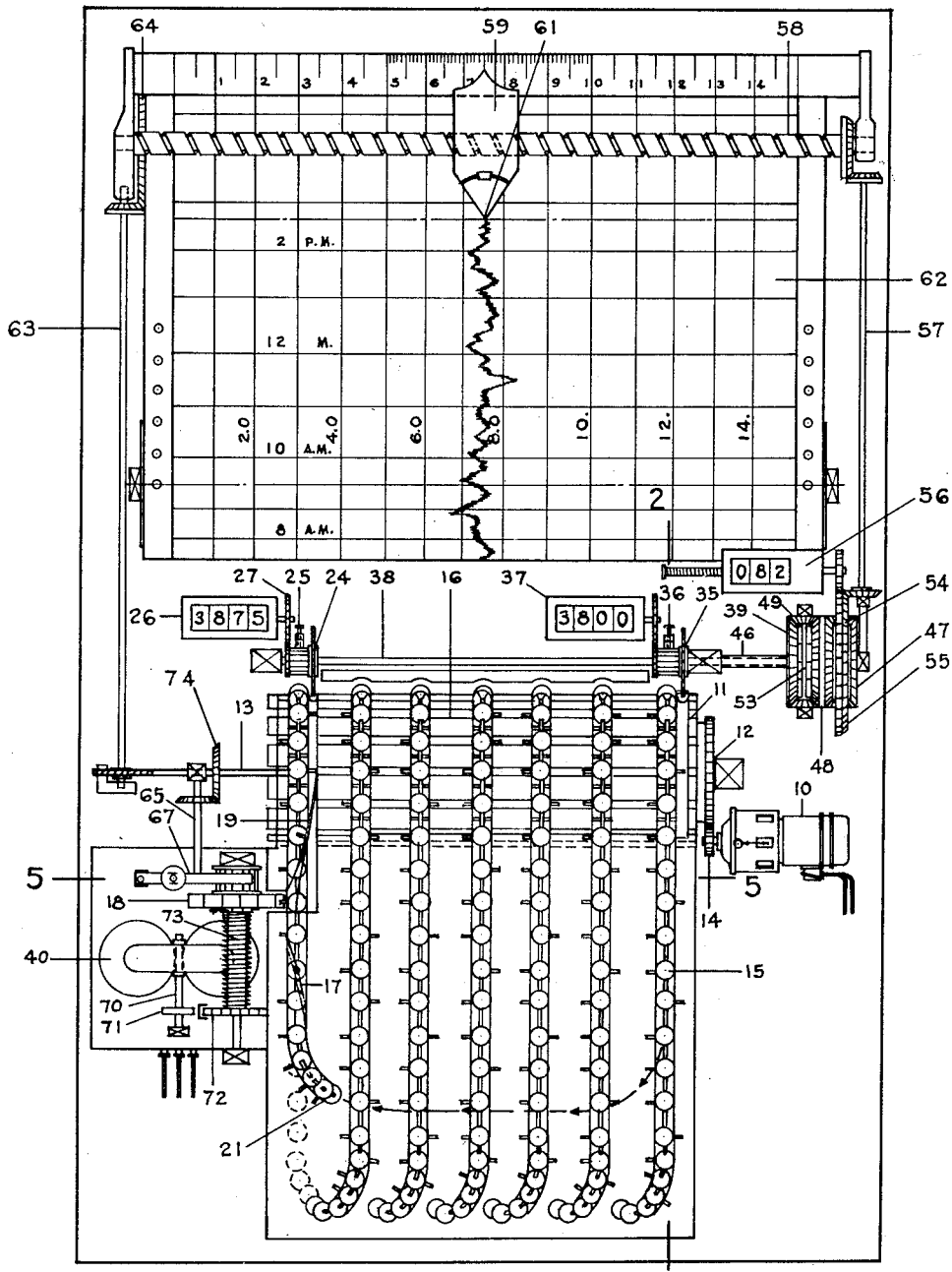

Aug. 12, 1952 — R. J. OWENS — 2,606,716
CONTINUOUS INTEGRATING DEMAND METER
Filed Nov. 19, 1949 — 2 SHEETS—SHEET 2

Robert J. Owens INVENTOR
BY Bentley Q. Morrow
Atty.

Patented Aug. 12, 1952

2,606,716

UNITED STATES PATENT OFFICE 2,606,716

CONTINUOUS INTEGRATING DEMAND METER

Robert J. Owens, Chattanooga, Tenn., assignor to Tennessee Valley Authority, a corporation of the United States Application November 19, 1949, Serial No. 128,451

2 Claims. (Cl. 235—91)

(Granted under the act of March 3, 1883, as amended April 30, 1928; 370 O. G. 757)

The invention herein described may be manufactured and used by or for the Government for governmental purposes without payment to me of any royalty thereon.

This invention relates to devices for continuously and automatically measuring average frequencies of electrical or mechanical impulses, the average speed of machinery, or the average rate of flow of a product based on time intervals of definite lengths. It is particularly adapted to serve as a continuous integrating demand meter for electrical systems.

Demand meters are commonly used to obtain records of the amount of electric power required from a system at various times, and the system must be constructed and operated to supply the maximum demand when needed. The usual power-sale rates include charges for monthly maximum demand, based on the average rate of power flow over a specified length of time, such as 15 minutes, 30 minutes, or 60 minutes. Demand meters are required to measure the power demand at all times, in order to catch and record the monthly maximum demand incurred by extraordinary loads. Load characteristics are therefore a principal factor in rate application.

The block-interval integrating demand meter is the type most commonly used. This type is essentially a mean-speed meter and, when used for the purpose of measuring electrical power demand, is actuated either mechanically or electrically by attachment to the moving part of a watt-hour meter. The watt-hour meter, primarily used to measure total integrated power, operates with mechanical speed proportional to the rate of power flow. The demand meter is sometimes combined mechanically with a watt-hour meter, or in other cases it is remotely located and actuated by means of an electrical circuit connection and contact making device from the moving part of a watt-hour meter.

Such contact device, operated at a frequency rate proportional to the mechanical speed of the watt-hour meter, supplies the electrical impulses necessary to actuate demand meters.

In the commonly used block-interval type of demand meter, a pen or other recording device is caused to move across a tape at a speed that is proportional to the speed of a watt-hour meter. At intervals of 15 or 30 minutes the pen is reset at the margin, the tape is moved forward a predetermined distance, and the pen again moves across the tape for the succeeding time interval. A curved line connecting the points of maximum travel of the pen will then show roughly the amount of electricity consumed in relationship to time. The method therefore consists of separate mechanical integration of watt-hour meter speed values for each of the clocked time intervals.

The method used in the block-interval demand meter is essentially a "cut and try" procedure. Since measurements are completed only at the finish of clocked intervals, true maximum demand may occur at any time between measurements and not be recorded.

Thermal and logarithmic types of demand meters are sometimes used for recording maximum power demands. These types furnish continuous measurements based on the logarithmic average rate of power flow. Temporary storage or integration of flow values over definite time intervals are approximated by heat storage or the equivalent and empirical constants based on assumed flow conditions.

An outstanding feature of the form of metering with which this application is concerned is some method of time-lagging or temporary storage of instantaneous values for a definite length of time. This feature relates to any devices for time-track recording and the reproduction of impulses or other signals capable of automatic integration.

United States Patents 2,431,125, 1,094,439, 1,764,340, 2,190,497, and 2,333,758 have used some sort of time track in this type of metering.

Prior devices have had the disadvantage of requiring expensive and complicated equipment, or have used electrical contacts subject to wear due to arcing and corrosion, have used mechanically weak paper tape as a time track, or have in other manners been lacking in dependability and accuracy under conditions of severe vibration, or have required a source of steady auxiliary power for energizing electromagnets.

It is an object of this invention to provide a metering device of the type described in which these disadvantages are eliminated.

Another object is to provide a device for measuring power demands with greater precision than is obtained by block-interval demand meters.

Another object is to provide a device of the type described which is simple in construction, strong, accurate, and has particular advantageous relationship of parts shown and described.

Other objects and advantages will become apparent as this disclosure proceeds.

I have now found that these objects are attained in a device of the type described comprising a time track consisting of an endless chain of laterally nonsymmetrical swiveled links;

means for advancing such time track at constant speed or through regular distances at regular intervals of time; a curved guide disposed in contact with said time track adapted to orient all links into identical nonsymmetrical relationship; a first toothed ratchet wheel disposed adjacent to said time track subsequent to said first curved guide in the direction of travel of said time track, responsive to impulses received and adapted to turn one of said swiveled links when said wheel is turned through an arc corresponding to the distance between the teeth thereof; a second curved guide disposed adjacent to said ratchet wheel, adapted to guide all links turned by said first toothed ratchet wheel into reversed lateral unsymmetrical relationship; a synchronizing escapement disposed to be driven at a speed proportional to that of said time track, adapted to permit movement of said first toothed ratchet wheel corresponding to the distance between teeth on said wheel only when one of said swiveled links is in line with said first toothed ratchet wheel; a second toothed ratchet wheel disposed adjacent to said time track subsequent to said second curved guide in the direction of travel of said track, adapted to be turned through an arc corresponding to the distance between its teeth by contact with each of said links whose lateral unsymmetry has been reversed; a third toothed ratchet wheel disposed adjacent to said time track at a predetermined distance along said chain from said second toothed ratchet wheel, adapted to be turned through an arc corresponding to the distance between its teeth by contact of each of said links whose lateral unsymmetry has been reversed; a differential gear assembly comprising a first single sun gear, a double sun gear disposed concentric therewith, one or more pinions meshed with said first single sun gear and with the corresponding face of said double sun gear and mounted rotatably upon stationary shafting; a second single sun gear disposed concentric with said double sun gear opposite to said first single sun gear; one or more freely movable pinions meshed with said single sun gear and the corresponding face of said double sun gear; a shaft attached to said second ratchet wheel and to one of said single sun gears adapted to rotate said sun gear in response to rotation of said second ratchet wheel; a shaft attached to said third ratchet wheel and to the other of said single sun gears adapted to rotate said other sun gear in response to rotation of said third ratchet wheel; and means, responsive to movement of said freely movable pinions, for indicating the extent of travel of the pinions around the periphery of said sun gears.

The attached drawings show diagrammatically one preferred type of apparatus embodying principles of my invention.

Figure 2:
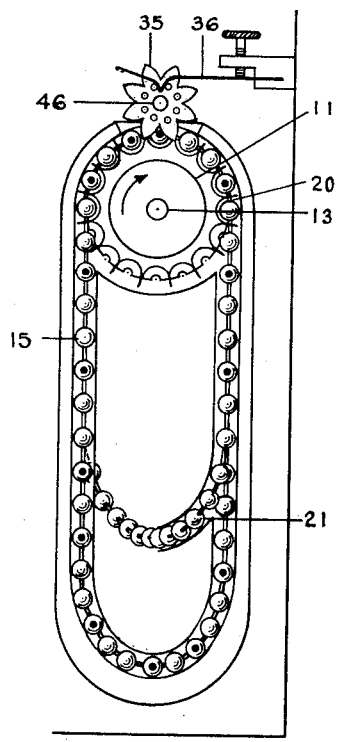
Figure 5:
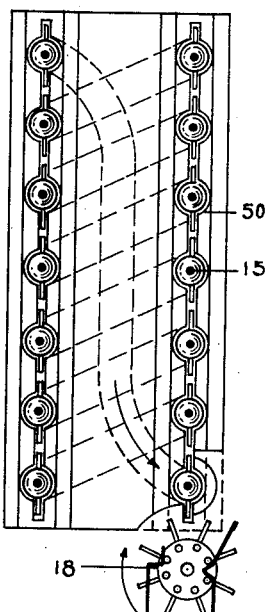
Figure 6:
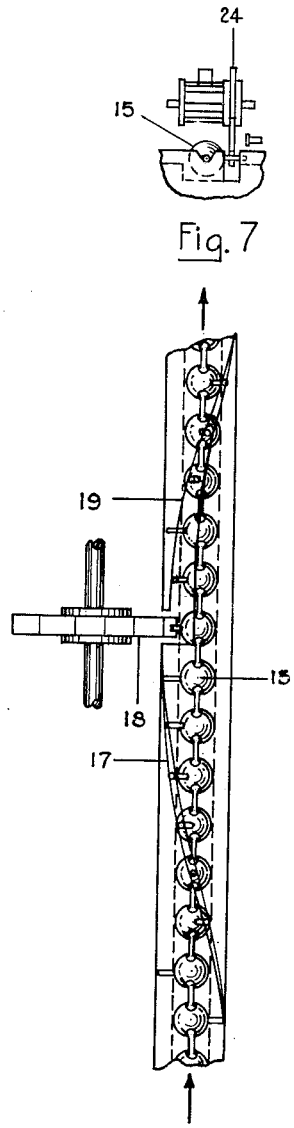
Figure 7:
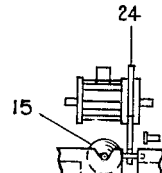
Figure 4:
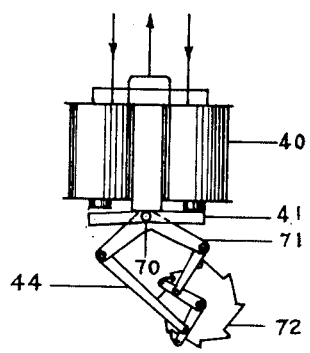
Figure 3:
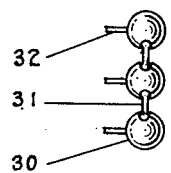

Figure 1 is an elevation of this apparatus, Figure 2 is a vertical section of the same apparatus on the line 2—2 of Figure 1, Figure 3 is a detail of one preferred type of endless chain consisting of laterally unsymmetrical swiveled links, Figure 4 shows one preferred type of impulse-actuated ratchet wheel usable for receiving electrical impulses, Figure 5 is a horizontal section through the apparatus of Figure 1 on the line 5—5, Figure 6 is a detail of a portion of the time track shown in Figure 1, and Figure 7 is a detail of ratchet wheels actuated by reversed links in the time track of Figure 1.

With reference to Figure 1, the numeral 10 indicates a constant-speed motor. A drum 11 suitably supported by and rigidly attached to shaft 13 is disposed adjacent to motor 10 and is adapted to be driven at constant speed by means of gear 12 and pinion 14. An endless chain 15 of laterally nonsymmetrical swiveled links is disposed upon drum 11 in driven relationship. Chain 15 is shown in detail in Figure 3. Drum 11 is preferably slotted as shown by slot 16 to receive lateral projections of links in chain 15. Suitable depressions shown as 20 in Figure 2 are preferably formed in drum 11 to obtain positive drive of chain 15. Chain 15 is preferably looped over drum 11 in a plurality of spiral loops and must contain a run out of contact with the drum 11 shown at 21 in Figure 2. This run 21 extends from the last of the spiral loops, when a plurality of these is used, to the first, in the direction shown by the line of arrows in Figure 1. A curved guide 17 is disposed adjacent to run 21 and is adapted to turn all nonsymmetrical swiveled links into identical nonsymmetrical relationship; that is, to orient all links so that the pins shown project from all links in the same direction after leaving guide 17. A ratchet wheel 18 is disposed adjacent to chain 15 subsequent to guide 17 in the direction of travel of the chain. Ratchet wheel 18 is disposed so that, in turning in response to impulses received in a manner to be described below, it turns a link of chain 15 sufficiently to cause the link to engage a suitable curved guide 19 which in turn guides the link into reversed nonsymmetrical relationship; that is, the pins shown on the links of chain 15 which have been turned by wheel 18 project to the right of the chain, whereas unturned links have pins projecting to the left.

A ratchet wheel 24 is disposed adjacent to drum 11 so that it is turned through an arc corresponding to the distance between its teeth by the passage of each unsymmetrical link which has been turned by ratchet wheel 18 and guide 19 into reversed lateral nonsymmetrical relationship. A ratchet 25 is provided to prevent wheel 24 from being turned by vibration. A counting device 26 may be operated from ratchet wheel 24 through suitable gearing 27 if desired. A second ratchet wheel 35 is disposed adjacent to drum 11 at a predetermined distance along the travel of chain 15 from ratchet wheel 24. Ratchet wheel 35 is also adapted to be turned through a distance corresponding to the distance between its teeth by passage of each link whose lateral unsymmetry has been reversed. A ratchet 36 is provided to prevent accidental turning of this wheel, and a conventional counter 37 also may be driven from wheel 35 if desired. Since wheel 24 and wheel 35 are located at a predetermined distance from each other in the path of chain 15, which is driven at constant speed, it is obvious that the rotation of wheels 24 and 35 offers a means for counting links reversed in a predetermined time interval.

A shaft 38 is rigidly attached to and is adapted to be turned by rotation of ratchet wheel 24. Shaft 38 connects ratchet wheel 24 with a single sun gear 47 of a differential gear assembly. A hollow shaft 46 is rigidly attached to and is adapted to be turned by rotation of ratchet wheel 35. Shaft 46 also is rigidly attached to single sun gear 39 of the differential gear assembly.

The differential gear assembly comprises a first single sun gear 39, a double-faced sun gear 48 concentric therewith, a plurality of pinions 49 disposed in mesh with the face of gear 39 and a face of double sun gear 48. Pinions 49 are disposed upon a stationary shaft 53 and serve as reversing idlers to cause gear 48 to rotate an equal and opposite distance to that which gear 39 is caused to rotate by rotation of ratchet wheel 35. Gear 47 is disposed concentric to gears 39 and 48, is of equal size therewith, and faces one face of gear 48 opposite to gear 39. A plurality of freely movable pinions 54 are disposed to mesh with gear 47 and the corresponding face of gear 48 and are carried upon suitable freely movable shafting. A ring gear 55 adapted to drive a maximum counter 56 and a train of gearing and shafting 57 is preferably mounted upon the shafting carrying pinions 54 and is rotated by travel of said pinions 54. Since counters 26, 37, and 56 are well known in the art they will not be described in detail. The train of gearing and shafting 57 is disposed to drive a screw 58 disposed adjacent to a chart 62. An indicating device 59 is disposed movably upon screw 58 and carries a pen 61 adapted to record the movement of indicator 59 on chart 62. A second train of gearing and shafting 63 is disposed to be driven by rotation of shaft 13 and, through gear 64, to drive chart 62 at constant speed.

Electrical impulses received by electromagnet 40 from circuit connections closed by the rotor of a watt-hour meter or other source of electrical impulses cause bar 41, shown in detail in Figure 4, to rock upon its pivot, operating the attached ratchet mechanism 71 to turn ratchet wheel 72 through an arc corresponding to a distance between the teeth of wheel 72. The mechanism shown in Figure 4 is well known in the art and may be purchased from manufacturers of standard electrical supplies. When the apparatus of my invention is to be used for recording mechanical impulses or steady motion, the electromagnet 40 may be eliminated and a suitable cam-and-shafting mechanism substituted therefor. A shaft 70 is rigidly attached to ratchet arrangement 71 and is adapted to turn ratchet wheel 72 through an arc corresponding to the distance between its teeth for each electrical impulse received. A spring 73 is rigidly attached substantially at the center of ratchet wheel 72 and to ratchet wheel 18. Rotation of ratchet wheel 72 thus increases tension on spring 73 and supplies force sufficient to turn wheel 18 through an arc corresponding to the distance between its teeth.

An escapement comprising bevel gears 74 driven by shaft 13 at a speed proportional to that of drum 11 and chain 15, a shaft 65 carrying cams 66, shown in Figure 5, and ratchet 67 allow rotation of ratchet wheel 18 only when a link of chain 15 is in position to be turned by rotation of wheel 18. I have found that cams 66 may be so designed and the tension of ratchet 67 may be so adjusted that wheel 18 is permitted to turn only through one arc equivalent to the distance between its teeth at each impulse exerted on shaft 65 by cams 66.

I have also found that by constructing spring 73 of suitable length and flexibility it is possible to rotate ratchet wheel 72 one entire revolution without causing erratic operation of ratchet wheel 18 with consequent inaccuracies in counting impulses received.

It will be obvious that the apparatus of my invention might be constructed with numerous variations from the structure shown. The time track chain 15 may be constructed of many types of laterally nonsymmetrical swiveled links. A flat sprocket chain with projecting lateral pins hinged to each link may be substituted for the chain 15, provided that wheel 18 is disposed to turn such pins into position to actuate ratchet wheels 24 and 35. The time track chain may advance by regular steps at regular intervals of time, instead of at constant speed as shown, and may be stationary between steps. The ratchet wheels 24 and 35 may be positioned to be actuated by those links of chain 15 which have not been reversed if desired. A suitable train of gearing and shafting may connect ratchet wheel 18, or ratchet wheel 72, with gear 47 of the differential gear assembly, thus eliminating ratchet wheel 24, although it is believed to be better practice to avoid the mechanical burden of such extra train of gearing on wheel 18, or the electromagnet 40.

Also, a torque motor actuated by a constant potential electrical supply and mechanically controlled by an escapement operated by electromagnet 40 may be attached to drive ratchet wheel 72 and also gear 47 by means of a suitable train of gearing and thereby eliminate ratchet wheel 24 without increasing the mechanical burden on electromagnet 40.

The time track might even consist of paper tape with recording made by perforation, notching, or metallic printing, provided one is willing to surrender many of the special advantages derived from the use of a metal chain.

Having described my invention and explained its operation, I claim:

1. In a device of the class described a chain of laterally nonsymmetrical swiveled links; means for driving the chain at constant speed; a curved guide disposed in contact with the chain to orient all links in the same direction; impulse-actuated means for turning one link in response to each impulse received; and mechanical means for indicating the number of links turned in a portion of the chan corresponding to a predetermined time interval.

2. The combination of claim 1 wherein each laterally nonsymmetrical swiveled link consists of a hollow sphere having two circular openings diametrically opposite each other; a pin rigidly attached to the sphere perpendicular to the diameter in which the openings lie; and a short rod having an enlarged end within the sphere, having a smaller central portion projecting through one of said openings and through the corresponding opening in a sphere of the next link in the chain, and having an enlarged end within said last-mentioned sphere.

ROBERT J. OWENS.

REFERENCES CITED

The following references are of record in the file of this patent:

UNITED STATES PATENTS

| Number | Name | Date |
| --- | --- | --- |
| 2,431,125 | Klaus | Nov. 18, 1947 |

FOREIGN PATENTS

| Number | Country | Date |
| --- | --- | --- |
| 250,922 | Germany | Sept. 24, 1912 |